US012475217B2

(12) United States Patent
Goodman et al.

(10) Patent No.: US 12,475,217 B2
(45) Date of Patent: Nov. 18, 2025

(54) SYSTEM AND METHOD FOR CRYPTOGRAPHIC SECURITY THROUGH PROCESS DIVERSITY

(71) Applicant: Dell Products L.P., Round Rock, TX (US)

(72) Inventors: Bradley K. Goodman, Nashua, NH (US); Joseph Caisse, Burlington, MA (US)

(73) Assignee: Dell Products L.P., Round Rock, TX (US)

( * ) Notice: Subject to any disclaimer, the term of this patent is extended or adjusted under 35 U.S.C. 154(b) by 666 days.

(21) Appl. No.: 17/864,490

(22) Filed: Jul. 14, 2022

(65) Prior Publication Data
US 2024/0020382 A1   Jan. 18, 2024

(51) Int. Cl.
*G06F 21/55* (2013.01)
*H04L 9/14* (2006.01)

(52) U.S. Cl.
CPC .............. *G06F 21/554* (2013.01); *H04L 9/14* (2013.01); *G06F 2221/034* (2013.01)

(58) Field of Classification Search
CPC ....... G06F 21/554; G06F 21/602; H04L 9/14; H04L 9/0894; H04L 9/3247
See application file for complete search history.

(56) References Cited

U.S. PATENT DOCUMENTS

| | | | |
|---|---|---|---|
| 2007/0208668 A1* | 9/2007 | Candelore | H04L 9/083 705/57 |
| 2008/0126808 A1* | 5/2008 | Price | G06F 21/6209 713/183 |
| 2010/0278338 A1* | 11/2010 | Chang | H04L 9/16 726/1 |
| 2019/0327089 A1* | 10/2019 | Liu | H04L 9/003 |
| 2021/0256162 A1* | 8/2021 | Liphardt | G06F 21/6245 |

* cited by examiner

*Primary Examiner* — Matthew T Henning
(74) *Attorney, Agent, or Firm* — WOMBLE BOND DICKINSON (US) LLP

(57) ABSTRACT

A method for securing a data processing system includes identifying an occurrence of a security event for an operation of the data processing system. Based on the occurrence, the method further includes: identifying a security requirement for the security event; performing at least two diverse cryptographic operations based on the security requirement and a cryptographic data package to obtain at least two cryptographic results, the at least two cryptographic results being provided by respective diverse cryptographic operations of the two diverse cryptographic operations; and performing an action set based on the at least two cryptographic results to service the operation of the data processing system.

20 Claims, 6 Drawing Sheets

SYSTEM AND METHOD FOR CRYPTOGRAPHIC SECURITY THROUGH PROCESS DIVERSITY

FIELD

Embodiments disclosed herein relate generally to security within a distributed computing environment. More particularly, embodiments disclosed herein relate to systems and methods to manage security through processing diversity in a distributed system.

BACKGROUND

Computing devices may provide computer-implemented services. The computer-implemented services may be used by users of the computing devices and/or devices operably connected to the computing devices. The computing devices may operate within a distributed system that may include various entities. These entities may present risk to the operation of the computing devices.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
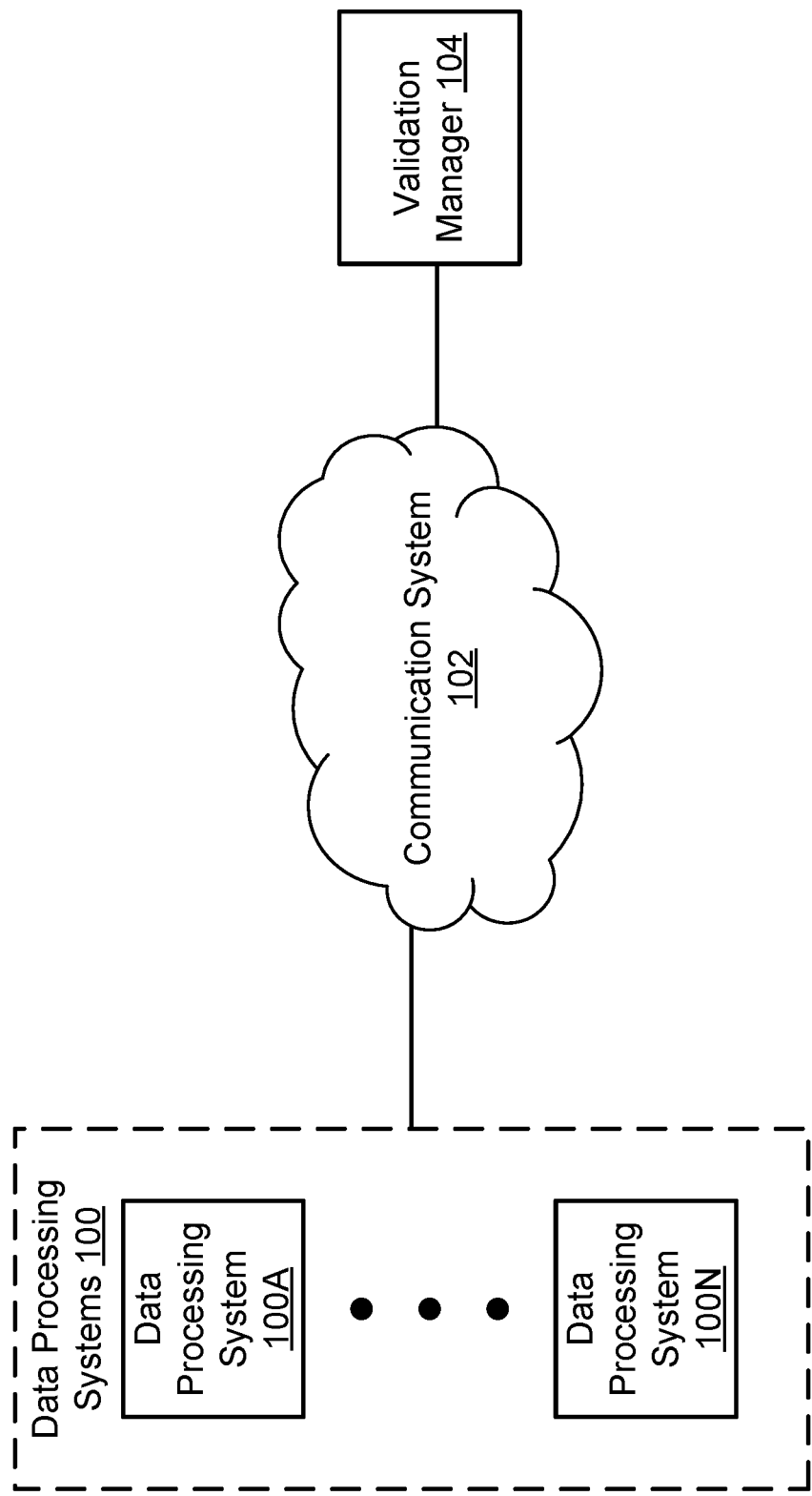
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing the operation of data processing systems. To manage the operation of data processing systems, a security framework may be enforced. The security framework may use diverse cryptographic operations and multiple portions of cryptographic data to reduce the impact of integrity failures of cryptographic operations.

For example, integrity failure of a cryptographic operation may place a data processing system at risk of compromise, data used by the data processing system at risk of access by unprivileged entities, and/or may otherwise cause unwanted impacts. To reduce the threat posed by integrity failures of cryptographic operations, the security framework may enforce security standards that limit the impact of cryptographic operation integrity failures. The security framework may limit this risk by requiring use of multiple diverse cryptographic algorithms that are each unlikely to be impacted by integrity failures of other cryptographic operations. Consequently, the performance of other diverse cryptographic operations along with a diverse cryptographic operation that has suffered an integrity failure may cause the data processing system to retain an expected or desired minimum level of security.

To facilitate use of diverse cryptographic operations, embodiments disclosed herein may provide a cryptographic data package that includes multiple portions of cryptographic data (e.g., a diverse set of keys, password, etc.) usable with respect different diverse cryptographic operations. A user or entity assigned a cryptographic data package may not need to independently manage different portions of cryptographic data for use with the different diverse cryptographic operations. Consequently, the cognitive burden on a user or other entities may not be increased through implementation of the security framework.

The cryptographic data included in the cryptographic data package may include, for example, public/private keys, symmetric keys, digital signatures, encrypted payloads, passwords, and/or other types of cryptographic data usable with cryptographic operations to facilitate varying levels of security for a data processing system. The use of multiple portions of the cryptographic data package may provide for flexibility such that different cryptographic data packages that include lessor or greater amounts of cryptographic data may still be usable to operate within the security framework. For example, rather than implementing rigid security requirements, the security framework may provide a flexible framework that may only require that a certain number of diverse cryptographic operations be successfully performed (e.g., a some of many standard) for the security requirements to be met. In this manner, the security framework implemented by the system may evolve over time (e.g., through introduction of new cryptographic operations, cryptographic data, etc.) while allowing data processing systems that may not have be entirely up to date with the evolved system to still successfully operate within the security framework.

In an embodiment, a method for managing operation of data processing systems through mediation of selective access to diagnostic data is provided. The method may include identifying an occurrence of a collection event for the diagnostic data from a data processing system of the data processing systems; obtaining a diagnostic data package using a selectively redacted version of the diagnostic data based on sensitivity of portions of the diagnostic data; and providing the diagnostic data package to a data processing systems manager.

Obtaining the diagnostic data package may include presenting information regarding a subset of the portions of the diagnostic (e.g., units such as different files, logs, etc.) data provisionally selected for inclusion in the diagnostic data package (e.g., as requested by a user) to a privileged user that has a level of privilege that affords the privileged user with authority disclose the subset of the portions of the diagnostic data to third parties; obtaining user feedback from the privileged use that is responsive to the presented information, the user feedback indicating: a first element (e.g., a unit such as a log, or portion thereof) of the subset of the portions of the diagnostic data is acceptable for third party disclosure, and a second element of the subset of the portions of the diagnostic data is not acceptable for third party disclosure; adding the first element to the diagnostic data package; and adding a redacted version of the second element to the diagnostic data package.

The redacted version of the second element may include an empty data element (e.g., a portion redacted by removal but retained the zeroes out bits to indicate that a redaction has occurred). Adding the redacted version of the second element may include omitting all information regarding the second element from the diagnostic data package (e.g., to hide the fact that a redaction has occurred).

The information regarding the subset of the portions of the diagnostic data may include type information for data elements of the subset of the portions of the diagnostic data. The information regarding the subset of the portions of the diagnostic data may not include contents of the data elements.

The subset of the portions of the diagnostic data may be selected by a requestor, the collection event may be a request from the requestor for the subset of the portions of the diagnostic data, and the requestor may be a vendor of a product associated with the data processing system.

Obtaining the diagnostic data package may include selecting a subset of the portions of the diagnostic data based on sensitivity selection criteria; adding the selected subset of the portions of the diagnostic data to the diagnostic data package; and omitting other portions of the diagnostic data that are not members of the subset from the diagnostic data package.

The selection criteria may include pattern rules. The selection criteria may include at least one selected from a group of criteria consisting of time ranges, service types, and information types.

In an embodiment, a method for securing a data processing system is disclosed. The method may include identifying an occurrence of a security event for an operation for the data processing system; based on the occurrence: identifying a security requirement for the security event; performing at least two diverse cryptographic operations based on the security requirement and a cryptographic data package to obtain at least two cryptographic results, the at least two cryptographic results being provided by respective diverse cryptographic operations of the two diverse cryptographic operations; and performing an action set based on the at least two cryptographic results to service the operation.

Each of the at least two diverse cryptographic operations may be performed as part of different types of cryptographic algorithms.

Each of the different types of cryptographic algorithms may have different cryptographic library dependencies. Each of the at least two diverse cryptographic operations may use different portions of cryptographic data of the cryptographic data package.

The operation may be a decryption operation for a file encrypted using at least two diverse encryption algorithms that are complementary to the at least two diverse cryptographic operations which are decryptions operations, and the at least two diverse decryption operations are performed sequentially on the file is sequentially dual encrypted.

The operation may be an encryption operation for a data structure, the at least two diverse operations may be encryption operations performed sequentially on the data structure, and the different portions of the cryptographic data of the cryptographic data package may be used to sequentially dual encrypt the data structure.

The operation may be a communication operation, and the at least two diverse operations may be validation operations performed in an at least partially parallel manner on a double signed data structure.

The operation may be for decryption of a file, the file may include a number of copies of a payload multiply encrypted using a combination of encryption algorithms, and the cryptographic data package may include cryptographic data for a combination of decryption algorithms complementary to one of the combinations of encryption algorithms, and the cryptographic data package may omit cryptographic data for other combinations of the decryption algorithms that are complementary to other combinations of the encryption algorithms.

The cryptographic data package may include multiple portions of cryptographic data.

The multiple portions of cryptographic data may include at least two symmetric keys, and at least two asymmetric keys.

The at least two diverse cryptographic operations may include a first diverse cryptographic operation that is performed using first cryptographic algorithm that depends on a first cryptographic library, and a second diverse cryptographic operation that is performed using second cryptographic algorithm of a type different from the first cryptographic algorithm, and the second cryptographic algorithm that depends on a second cryptographic library that provides an implementation for a hash function that is different from an implementation for a hash function provided by the first cryptographic library.

The security requirement may indicate a threshold quantity of successfully performed cryptographic operations for a security risk associated with the operation to be considered tolerable for performance of the operation.

A non-transitory media may include instructions that when executed by a processor cause one or more of the computer-implemented methods to be performed.

A data processing system may include the non-transitory media and a processor, and may perform one or more of the computer-implemented methods when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer-implemented services, the system may include any number of data processing systems 100. Data processing systems 100 may provide the computer implemented services to users of data processing systems 100 and/or to other devices (not shown). Different data processing systems (e.g., 100A, 100N) may provide similar or different computer implemented services.

Data processing systems 100 may be part of a distributed system. The distributed system may present risk to data processing systems 100. For example, the distributed system may provide attackers with various avenues to attempt to compromise any of data processing systems 100 and/or data (which may be sensitive to various persons) used by the data processing systems and/or other devices. The attacker may be a person that lacks sufficient privilege to use various functionalities provided by data processing systems 100, to use portions of data hosted thereon, and/or otherwise use and/or interact with data processing systems 100 (directly or through an intermediary device and/or agents such as computer viruses/programs).

To reduce the likelihood of data processing systems 100 or data hosted thereby from being compromised, data processing systems 100 may implement various security processes. These security processes may use cryptographic data (e.g., passwords, keys, etc.) to reduce the likelihood of an attacker successfully compromising a data processing system or data hosted thereby.

The security processes may include, for example, encryption/decryption processes to restrict access to data, validation processes to ascertain whether to perform various operations, and/or other types of processes that may secure data processing systems 100 against attacks. Any of these security processes may utilize cryptographic algorithms (encryption/decryption, authentication, etc., which may be part of broader security frameworks such as public key infrastructure), and any of the cryptographic algorithms may utilize libraries of functions (e.g., hash functions, mathematic functions) during execution of the security processes. Performance of these security processes may reduce the likelihood of successful attacks against data processing systems 100.

However, the security provided by these security processes may depend on the viability of the cryptographic algorithms, frameworks, and/or libraries used in these security processes. For example, errors in the implementation of functions provided by a library upon which a cryptographic algorithm depends may result in the cryptographic algorithms providing a reduced level of security than that expected through use of the cryptographic algorithm. Likewise, if a cryptographic algorithm is cracked due to an advance in computing technology (e.g., quantum computing), the cryptographic algorithm may provide a reduced level of security than that expected through use of the cryptographic algorithm.

In general, embodiments disclosed herein may provide methods, systems, and/or devices for securing data processing systems. To secure the data processing systems, a security framework that mandates use of diverse cryptographic operations may be provided. The security framework may enforce a security standard for responding to security events that reduces the dependence of the data processing systems on the integrity of a cryptographic algorithm, library, framework, etc. for securing the data processing systems through use of diverse security operations. By using diverse security operation, a data processing system in accordance with embodiments disclosed herein may be less likely to be compromised when a cryptographic algorithm, library, framework, etc. provides a lesser degree of security (e.g., when its integrity is compromised) than expected.

Diverse cryptographic operations may be types of cryptographic operations that each utilize different cryptographic algorithms, different libraries, and/or may be part of different security frameworks. Consequently, each of the diverse cryptographic operations may present separate challenges for attackers to bypass. By requiring performance of multiple diverse cryptographic operations for a given security event, the failure in the integrity of one of the multiple diverse cryptographic operations (e.g., due to a compromise of the corresponding cryptographic algorithm, a library relied upon in performance of the cryptographic algorithm, etc.) may not result in the response to the security event that is implemented by a data processing system failing to provide an expected level of security. For example, if one of the diverse cryptographic operations performed as part of the response suffers an integrity failure, the other diverse cryptographic operations may ensure that the response to the security event is completed with an expected level of security. The other diverse cryptographic operation may utilize different cryptographic algorithms which may also utilize other libraries from those utilized libraries used by the cryptographic algorithms implemented by a diverse cryptographic operation that has suffered an integrity failure.

To facilitate performance of multiple diverse security operations, the system of FIG. 1 may utilize cryptographic data packages that include multiple, diverse portions of cryptographic data corresponding to diverse cryptographic operations. To complete a diverse cryptographic operation, a corresponding portion of the cryptographic data package may be utilized. For example, in the context of an encryption operation (e.g., a cryptographic operation) type of security event, multiple portions of the cryptographic data may be used to perform multiple encryptions using different encryption algorithms to dual encrypt (e.g., in a sequential manner, or more generally sequentially encrypt any number of times using different portions of cryptographic data) some data. A cryptographic data package may include any number of portions of cryptographic data which may be used in any number of corresponding cryptographic operations.

The cryptographic data packages utilized by the system of FIG. 1 may provide a transparent mechanism through which users may effectively manage cryptographic data corresponding to any number and types of cryptographic operations. Consequently, through use of a cryptographic data package, a user may provide necessary portions of cryptographic data to facilitate performance of multiple diverse cryptographic operations without increasing a cognitive burden on users for managing various portions of cryptographic data such as multiple keys usable for different types of cryptographic operations (e.g., symmetric/asymmetric key based operations).

To implement the security framework, data processing systems 100 may (i) identify occurrences of security events, (ii) identify security requirements for the security events, (iii) perform at least two diverse cryptographic operations based on the security requirements to obtain cryptographic results, and/or (iv) use the cryptographic results to respond to corresponding security events. The security requirements may specify standards for different types of security events.

In an embodiment, different cryptographic data packages may include different types and amounts of cryptographic data. Consequently, not all cryptographic data packages may include cryptographic data usable to perform all types of cryptographic operations. In such a scenario, the security requirements may specify a flexible standard. The flexible security standard may allow for cryptographic data packages having different contents to be used to respond to security events. In an embodiment, the flexible security standard specifies a several of many requirement in which a certain number of various types of cryptographic operations may need to be successfully performed. Different cryptographic data packages may satisfy this standard by facilitating performance of different types of cryptographic operations. Consequently, a cryptographic data package that includes different or less cryptographic data than other cryptographic data packages may still facilitate completion of a required number of cryptographic operations even when the packages do not include cryptographic data for some cryptographic operations. Accordingly, a system in accordance with an embodiment may be capable of integrating new cryptographic algorithms over time without needing to update all cryptographic data packages because the several of many requirement may allow legacy cryptographic data packages (which may omit certain cryptographic data corresponding to the new cryptographic algorithms) to continue to be used to respond to security events.

In an embodiment, a standard specified by a security requirement indicates for example, (i) a number of diverse cryptographic operations that must be successfully completed for a given security event, (ii) types of the diverse cryptographic operations, and/or (iii) other information for managing a response to an occurrence of a security event. Consequently, any security standard may require the use of any number of portions of cryptographic data of a cryptographic data package for a response to an occurrence of a corresponding security event, while still allowing for flexibility with respect to cryptographic data packages that include different quantities and/or types of cryptographic data.

Figure 2:
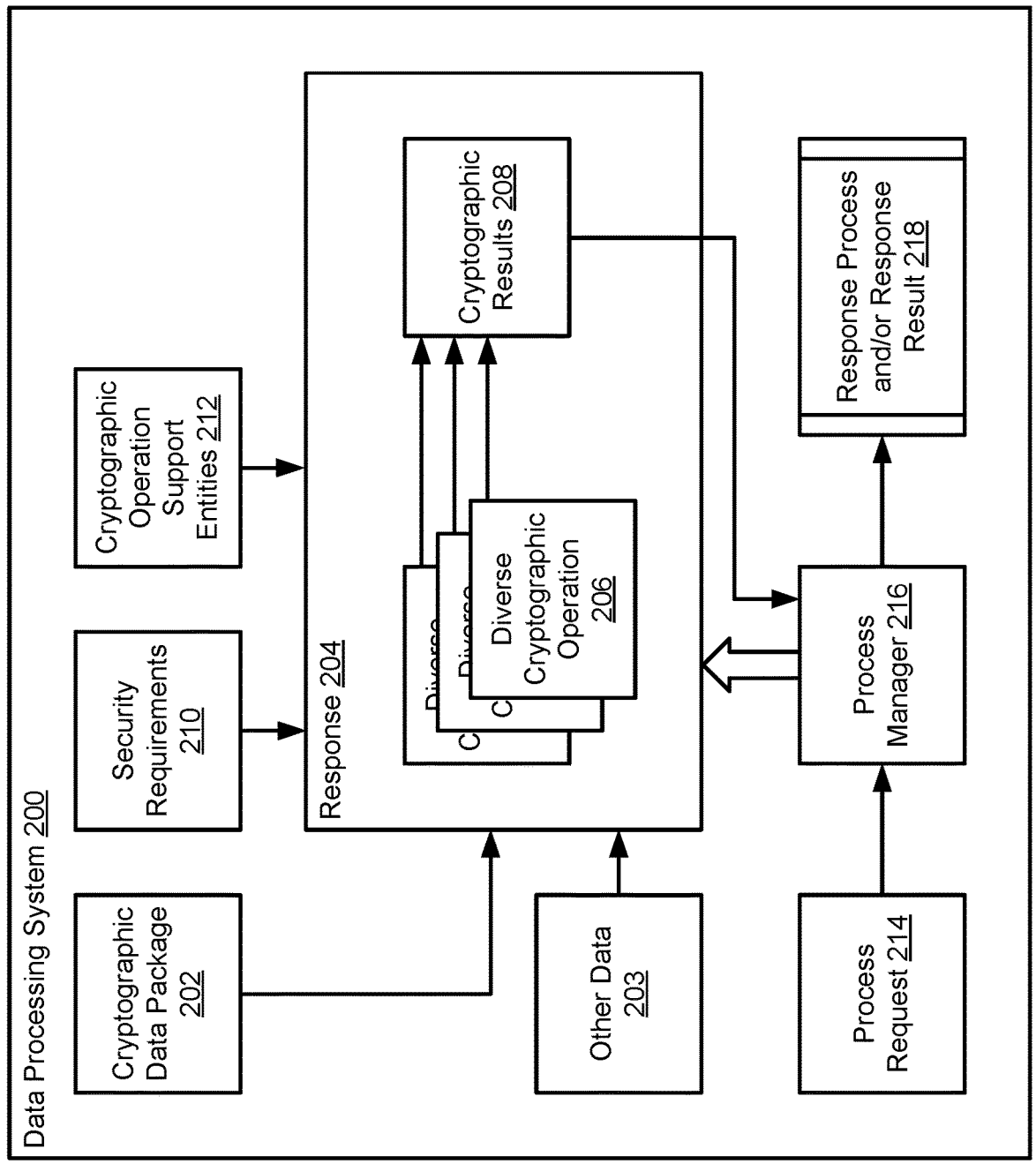
FIG. 2 show a diagram illustrated a response to service an operation within a security framework in accordance with an embodiment.

Refer to FIG. 2 for additional details regarding data processing systems 100. When providing their functionalities, any of data processing systems 100 may perform all, or a portion, of the methods, operations, and/or processes illustrated in FIGS. 3-4B.

To facilitate implementation of the security framework, the system of FIG. 1 may include validation manager 104. Validation manager 104 may perform various security functions including, for example, (i) cryptographic data package management (e.g., generation, distribution, assignment, etc.), (ii) performance of portions of cryptographic operations, and/or (iii) other functions for securing data processing systems 100.

Figure 3:
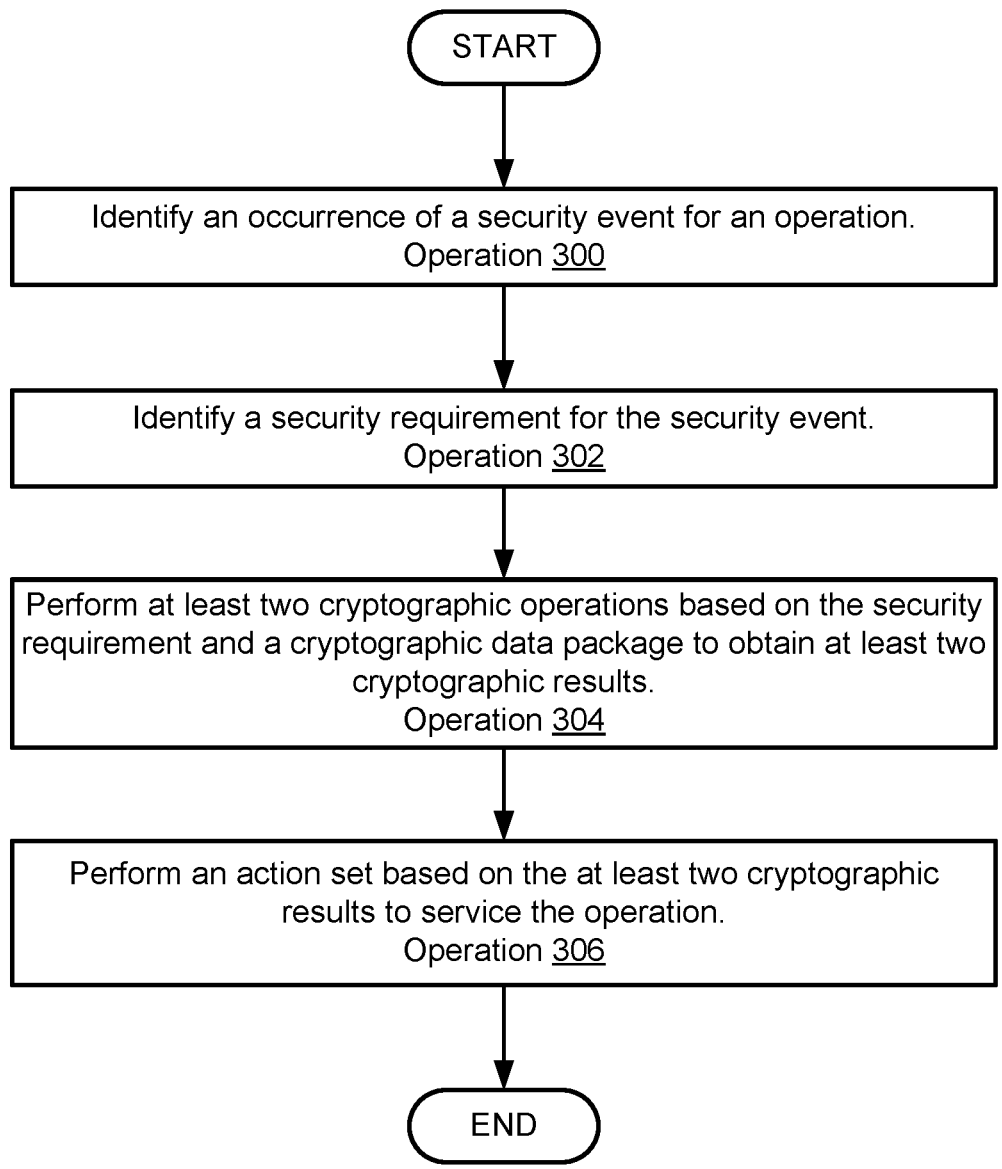
FIG. 3 shows a flow diagram illustrating a method of servicing an operation in accordance with an embodiment.
Figure 4A:
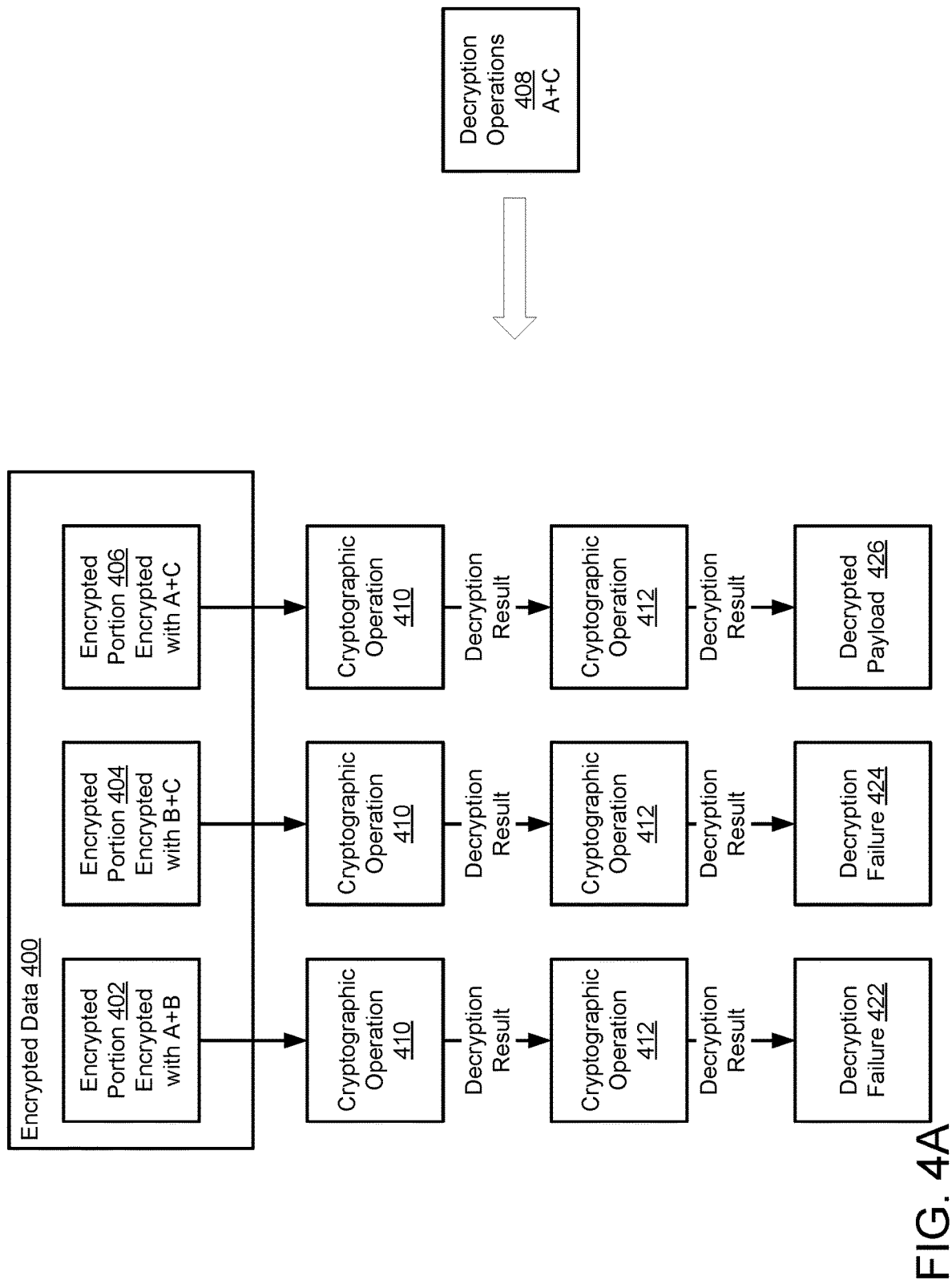
FIG. 4A shows a data flow diagram illustrating decryption of data within a security framework in accordance with an embodiment.
Figure 4B:
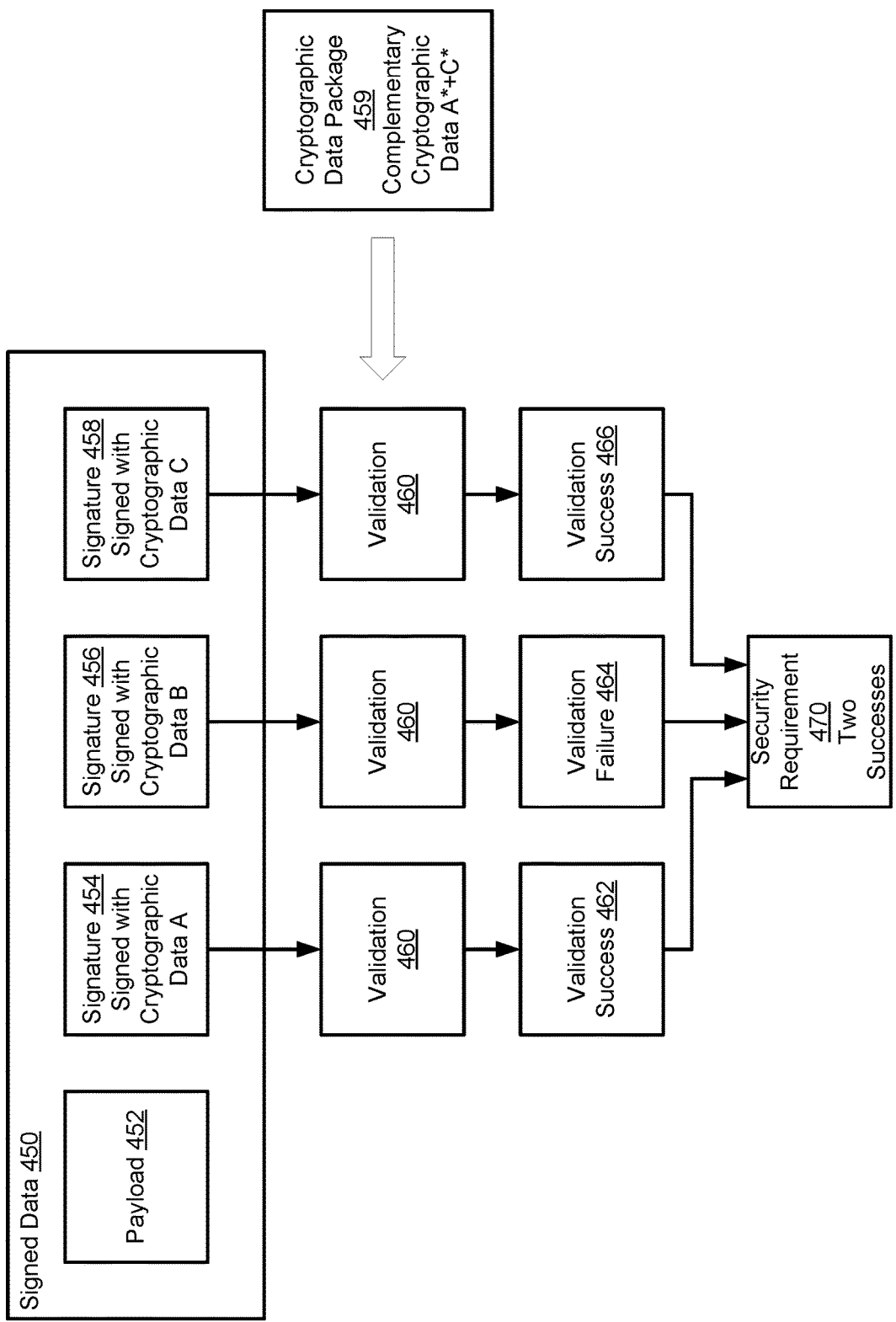
FIG. 4B shows a data flow diagram illustrating validation of data within a security framework in accordance with an embodiment.

When providing its functionalities, validation manager 104 may perform all, or a portion, of the methods, operations, and/or processes illustrated in FIGS. 3-4B. While illustrated in FIG. 1 as being separate from data processing systems 100, validation manager 104 may be implemented as part of one or more of data processing systems 100, as a shared service, and/or via other methods from that illustrated in FIG. 1.

Any of data processing systems 100 and validation manager 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, a diagram illustrating data flows implemented by and data structures used by a system over time in accordance with an embodiment is shown in FIG. 2.

Turning to FIG. 2, a data flow diagram illustrating data flows, data processing, and/or other operations that may be performed the system of FIG. 1 in accordance with an embodiment is shown. Data processing system 200 may be similar to any of data processing systems 100.

As discussed with respect to FIG. 1, data processing system 200 may monitor for and take action with respect to security events. The security events may include any number and types of events that relate to security risks presented to data processing system 200. For example, the security events may include (i) obtaining copies of data structures that are alleged to be from another entity, (ii) identifying a need to communicate with another entity, (iii) obtaining encrypted data, (iv) identifying a need to encrypt data, and/or (v) other types of events that may present security risks to data processing system 200 and/or events that have a level of security risk that may be reduced through use of cryptographic data from a cryptographic data package.

To identify occurrences of security events, process manager 216 may monitor operation of data processing system 200. Through monitoring, process manager 216 may, for example, obtain process request 214 which may implicate use of cryptographic data package 202. For example, process request 214 may be a request to encrypt or decrypt data, to communicate with another device of an insecure communication channel (e.g., via a communication system), may be request to ascertain whether certain data alleged to be for another entity can be validated, and/or other types of processes.

When a security event is identified, process manager 216 may launch response 204. Response 204 may include initiating performance of multiple diverse cryptographic operations (e.g., 206) depending on security requirements 210. The diverse cryptographic operations may utilize different portions of cryptographic data from cryptographic data package 202. The type of each diverse cryptographic operation may depend on the type of the process request and data (e.g., other data 203) on which the diverse cryptographic operations operate. For example, other data 203 may include data to-be-encrypted, encrypted data to-be-decrypted, data that may be signed and that may need to be validated, and/or other types of data that may be subject to processing using portions of cryptographic data package 202.

Different operations of the diverse cryptographic operations may depend on different entities from cryptographic operation support entities 212. For example, cryptographic operation support entities may include different libraries used by different diverse cryptographic operations. Security requirements 206 may ensure, as noted above, that some different entities of the cryptographic operation support entities 212 are used by different diverse cryptographic operations so that a failure in the integrity of any of the entities of cryptographic operation support entities 212 does not impact all of the performed diverse cryptographic operations.

Different diverse cryptographic operations may generate different cryptographic results (e.g., in aggregate, cryptographic results 208). Due to the use of diverse cryptographic operations, the resulting cryptographic results may be less likely to all be impacted by integrity failures of any of the diverse cryptographic operations.

Process manager 216 may review cryptographic results 208 and initiate a response process and/or generate a response result (e.g., depending on a type of process request 214). The response process may be, for example, (i) to provide and/or send a copy of encrypted data to another entity, and the encrypted data may be an aggregation of the cryptographic results which may be various dual or multiply encrypted copies of data using different combinations of portions of cryptographic data package 202, (ii) to indicate that a signed data structure has or has not been validated, the cryptographic results may be results of attempted validations of various signatures (or other types of cryptographically verifiable data), and the aggregate cryptographic results 208 defining an outcome based on a standard set by security requirements 210, (iii) to provide decrypted data, the cryptographic results from the diverse cryptographic operations may be attempts to decrypt different portions of data in an encrypted data package using various portions of cryptographic data package 202 (e.g., to reverse dual or other multiple encryption schemes), and the aggregate cryptographic results 208 may include at least one successful decryption of a portion of data which may be the decrypted data, and/or (iv) other types of response processes and/or response results.

By doing so, embodiments disclosed herein may facilitate both symmetric and asymmetric approaches to cryptographic based security for data processing systems.

In an embodiment, one or more of process manager 216, diverse cryptographic operations (e.g., 206), cryptographic operation support entities 212, and process response 218 are implemented using a hardware device including circuitry. The hardware device may be, for example, a digital signal processor, a field programmable gate array, or an application specific integrated circuit. The circuitry may be adapted to cause the hardware device to perform the functionality of process manager 216, diverse cryptographic operations (e.g., 206), cryptographic operation support entities 212, and/or process response 218. Process manager 216, diverse cryptographic operations (e.g., 206), cryptographic operation support entities 212, and/or process response 218 may be implemented using other types of hardware devices without departing embodiment disclosed herein.

In one embodiment, one or more of process manager 216, diverse cryptographic operations (e.g., 206), cryptographic operation support entities 212, and process response 218 are implemented using a processor adapted to execute computing code stored on a persistent storage that when executed by the processor performs the functionality of process manager 216, diverse cryptographic operations (e.g., 206), cryptographic operation support entities 212, and/or process response 218 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, data processing system 200 includes storage which may be implemented using physical devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage may include a memory device (e.g., a dual in line memory device) in which data is stored and from which copies of previously stored data are provided. In another example, storage may include a persistent storage device (e.g., a solid-state disk drive) in which data is stored and from which copies of previously stored data is provided. In a still further example, storage may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage may store data structures including cryptographic data package 202, other data 203, security requirements, cryptographic results 208, process request 214, and/or a response result (e.g., 218). Any of these data structures may be implemented using, for example, lists, tables databases, linked lists, unstructured data, and/or other types of data structures.

While data processing system 200 are illustrated in FIG. 2 as including a select number of components and as storing specific types of information, data processing system 200 may include different components and may store other types of data without departing from embodiments disclosed herein.

As discussed above, the components of FIG. 1 may perform various methods to secure data processing systems through use of diverse cryptographic operations. FIG. 3 illustrates a method that may be performed by the components of FIG. 1. In the diagrams discussed below and shown in FIG. 3, any of the operations may be repeated, performed in different orders, and/or performed in parallel with or in a partially overlapping in time manner with other operations.

Turning to FIG. 3A, a flow diagram illustrating a method of servicing an operation in accordance with an embodiment is shown. The method may be performed by a data processing system and/or other components of the system shown in FIG. 1.

At operation 300, an occurrence of a security event for an operation is identified. The security event may be identified by monitoring operation of a data processing systems and matching the monitoring against characteristics of different types of security events. For example, a security event may be receipt of a request to decrypt data, to encrypt data, to perform a validation, and/or other types of operation of a data processing system. The operation may be any type of operation that may implicate use of cryptographic data from a cryptographic data package as part of the operation.

In an embodiment, the operation is an encryption operation or a decryption operation. A security framework implemented by a data processing system may use diverse cryptographic operations to multiply encrypt or multiply decrypt data to complete the operation. By doing so, an integrity failure of one of the diverse cryptographic operations (directly by a corresponding cryptographic algorithm, or indirectly through library dependence of the cryptographic algorithm) may not result in a reduced level of security than that expected for the operation.

In an embodiment, the operation is a validation operation or a signing operation. A security framework implemented by a data processing system may use diverse cryptographic operations to multiply validate or sign a data structure to complete the operation. By doing so, an integrity failure of one of the diverse cryptographic operations (directly by a corresponding cryptographic algorithm, or indirectly through library dependence of the cryptographic algorithm) may not result in a reduced level of security than that expected for the operation.

At operation 302, a security requirement for the security event is identified. The security requirement may be identified by matching a type of the security event and/or operation to different types of security requirements (which may be respectively associated with types of security events) to identify the security requirement. For example, a lookup may be performed based on the type of the security event, and the lookup may provide the security requirements for the security event.

The security requirements may specify how a response process for the occurrence of the security event is to be performed and/or standards for judging whether the response process passes a standard for the security requirement. For example, the security requirements may specify whether serial or parallel diverse cryptographic operations are to be performed, which portions of cryptographic data from a cryptographic data package are to be used in the diverse cryptographic operations, etc.

At operation 304, at last two diverse cryptographic operations are performed. The at least two diverse cryptographic operations may be based on the security requirement (e.g., which may specify which diverse cryptographic operations if successfully performed may satisfy a security standard specified by the security requirement). The at least two diverse cryptographic operations may also be based on a cryptographic data package (e.g., the cryptographic operations may be performed using portions of the cryptographic data package, and the portions may be indicated by the security requirement). Each of the at least two diverse cryptographic operations may generate a corresponding cryptographic result which may be aggregated to obtain a response result.

In an embodiment, the at least two diverse cryptographic operations are decryption operations or encryption operations to multiply decrypt or encrypt data. Each of the encryption/decryption operations may utilize different combinations of cryptographic data to encrypt data or decrypt data. The cryptographic data of each combination may be sequentially used to perform encryptions or decryptions.

For example, in a multiple encryption scenario with a security requirement of use of two out of three types of cryptographic algorithms for data encryption, three copies of the to-be-encrypted data may be serially encrypted using different cryptographic algorithm combinations of the three cryptographic algorithms. The resulting encrypted data may be aggregated to obtain encrypted data having three different portions that may be decrypted using different combinations of the three cryptographic algorithms. In an example, a payload may be encrypted using a first encryption algorithms to obtain a cypher text which is then encrypted using a second cryptographic encryption algorithm to obtain a second cypher text which may be decrypted by serially performing decryption algorithms complementary to the second and first cryptographic encryption algorithms, respectively. This process may be repeated for two other copies of the payload and other combinations of three cryptographic encryption algorithms to obtain encrypted data. Refer to FIG. 4A for additional details regarding decryption of the encrypted data.

In an embodiment, a first algorithm is complementary to a second algorithm if the first algorithm is able to reverse a process implemented by the second algorithm. For example, a decryption algorithm may be complementary to an encryption algorithm if it is able to decrypt data encrypted using the encryption algorithm.

In an embodiment, the at least two diverse cryptographic operations are signing/validation operations. Each of the signing/validation operations may utilize different portions of cryptographic data to sign or validate signed data.

For example, in a signing scenario with a security requirement of successful validation of two out of three signatures, a payload may be signed using three different portions of cryptographic data. The resulting signed data may include three signatures that may be validated using corresponding portions of cryptographic data. Refer to FIG. 4B for additional details regarding validation of the signed data.

At operation 306, an action set, that is based on the at least two cryptographic results, is performed to service the operation. The action set may include any number of actions. The actions may facilitate either performance of the operation or denial of performance of the operation (e.g., when security requirements for corresponding security requirements are not met). The action set may include one or more of (i) providing a copy of multiply encrypted data to another entity, (ii) providing a copy of decrypted data to another entity, (iii) indicating that a data structure has been validated, (iv) indicating an encryption/decryption has failed or not meet a security standard, and/or (iv) indicating that a validation has failed to meet a security requirement.

The method may end following operation 306.

Using the method illustrated in FIG. 3, a system in accordance with embodiments disclosed herein may have a reduced risk profile through use of multiple diverse cryptographic operations of an enforced security framework.

As discussed above, the method of FIG. 3 may be used to service operations as part of a security framework. FIGS. 4A-4B show examples of uses of the security framework for different types of operations in accordance with an embodiment.

Turning to FIG. 4A, a data flow diagram for a decryption operation in accordance with an embodiment is shown. The decryption operation may be for encrypted data 400 that includes a payload previously encrypted in accordance with the security framework disclosed herein. Encrypted data 400 may include three encrypted portions 402, 404, 406 that were each generated by sequentially encrypting different copies of a payload using different combinations of three diverse encryption operations A, B, and C. For example, encrypted portion 402 was sequentially encrypted using diverse encryption operations A and B, while encrypted portion 406 was sequentially encrypted using diverse encryption operations A and C.

Now, consider a scenario in which the data processing system tasked with decrypting the payload is a legacy system that only supports decryption operations that are complementary to diverse encryption operations A and C (e.g., illustrated as decryption operations 408 in FIG. 4A). In this scenario, the data processing system is unable to successfully decrypt encrypted portions 402 and 404, but is able to decrypt encrypted portion 406.

For example, to decrypt encrypted data 400, the data processing system may automatically implement a response that includes multiple sequentially performed decryption operations on each of the portions. The parallel, sequential decryption operations may include cryptographic operation 410 (using a decryption operation complementary to diverse encryption operation C) applied in parallel to each of encrypted portion 402, 404, 406. Consequently, only one of the encrypted portions (e.g., 406) is initially successfully decrypted to obtain a successfully decrypted decryption result that may be decrypted using the decryption operation complementary to encryption operation A.

The data processing system may then perform cryptographic operation 412 on each of the decryption results from cryptographic operation 410. Cryptographic operation 412 may be a decryption operation complementary to encryption operation A. Consequently, the decryption result for encryption portion 406 from cryptographic operation 410 is decrypted payload 426, while the other decryption results from cryptographic operation 412 with respect to the other encrypted portions 402, 404 are decryption failures (e.g., 422, 424) because neither of these encrypted portions (e.g., 402, 404) were sequentially decrypted using decryption operations complementary to the encryption operations used to obtain these encrypted portions.

Thus, as illustrated in FIG. 4A, a data processing system in accordance with embodiments disclosed herein may implement a security framework that provides flexibility with respect to capabilities. For example, here a security requirement enforced by the security framework required that encrypted data 400 require use of two diverse cryptographic operations. To provide flexibility, the response implemented based on this security requirement resulted in the generation of encrypted data 400 that meets this requirement while allowing different data processing systems with different decryption capabilities to still successfully operate within the security framework. Accordingly, a system in accordance with embodiments disclosed herein may provide flexibility so that new cryptographic operations (or other types of changes) may be adopted by the security framework without requiring that all data processing systems operating within the security framework update their operation and/or capabilities to comply with the security framework.

Turning to FIG. 4B, a data flow diagram for a validation operation in accordance with an embodiment is shown. The validation operation may be for signed data 450 that includes payload 452 and three signatures 454, 456, 458 signed with different portions of cryptographic data A, B, and C, respectively.

Now, consider a scenario in which a data processing system that is tasked with validating payload 452 is a legacy system. The legacy system may include cryptographic data package 459 which only includes complementary cryptographic data A* and C* usable to validate signatures that are signed with cryptographic data A and C. For example, A and A* may be a public-private key pair. In this scenario, the data processing system is able to successfully validate signed data 450 under a security requirement that specifies that at least two signatures must be successfully validated.

For example, to validate signed data 450, the data processing system may automatically implement a response that includes multiple sequentially performed validation operations on each of signatures 454, 456, 458 using the available complementary cryptographic data A* and C*. For example, validation 460 may be performed with respect to each of the signatures and may include attempting to validate the signatures with A* and C*. Successful validation using A* or C* may be treated as a successful validation of the signature.

In this example, validation 460 with respect to signature 454 and 458 is successful, but validation 460 with respect to signature 456 is unsuccessful because the data processing system does not include complementary cryptographic data for cryptographic data B. Thus, two validation successes (e.g., 462, 466) are obtained while one validation failure 464 is obtained.

The validation success count may then be compared to security requirement 470 to identify whether signed data 450 has been successfully validated within the security framework. In this example, security requirement 470 indicates that two successful validations with respect to signed data 450 are required for signed data 450 to be considered as being validated. In this example, security requirement 470 is met, and, accordingly, signed data 450 may be treated as being validated even though at least one of the signatures could not be successfully validated using the cryptographic data available to the data processing system.

Thus, as illustrated in FIG. 4B, a data processing system in accordance with embodiments disclosed herein may implement a security framework that provides flexibility with respect to cryptographic data. For example, here a security requirement enforced by the security framework required that the data processing system successfully validate signed data 450 a requisite number of times, but that all of the signatures need not be validated for signed data 450 to be treated as being successfully validated. By doing so, the security framework may allow for data processing systems to continue to operate within the security framework even though each of the data processing systems may not have access to all cryptographic data used by the security framework. Consequently, as new cryptographic data is deployed within the security framework, the data processing systems operating within the security framework may not need to have access to the new cryptographic data.

Figure 5:
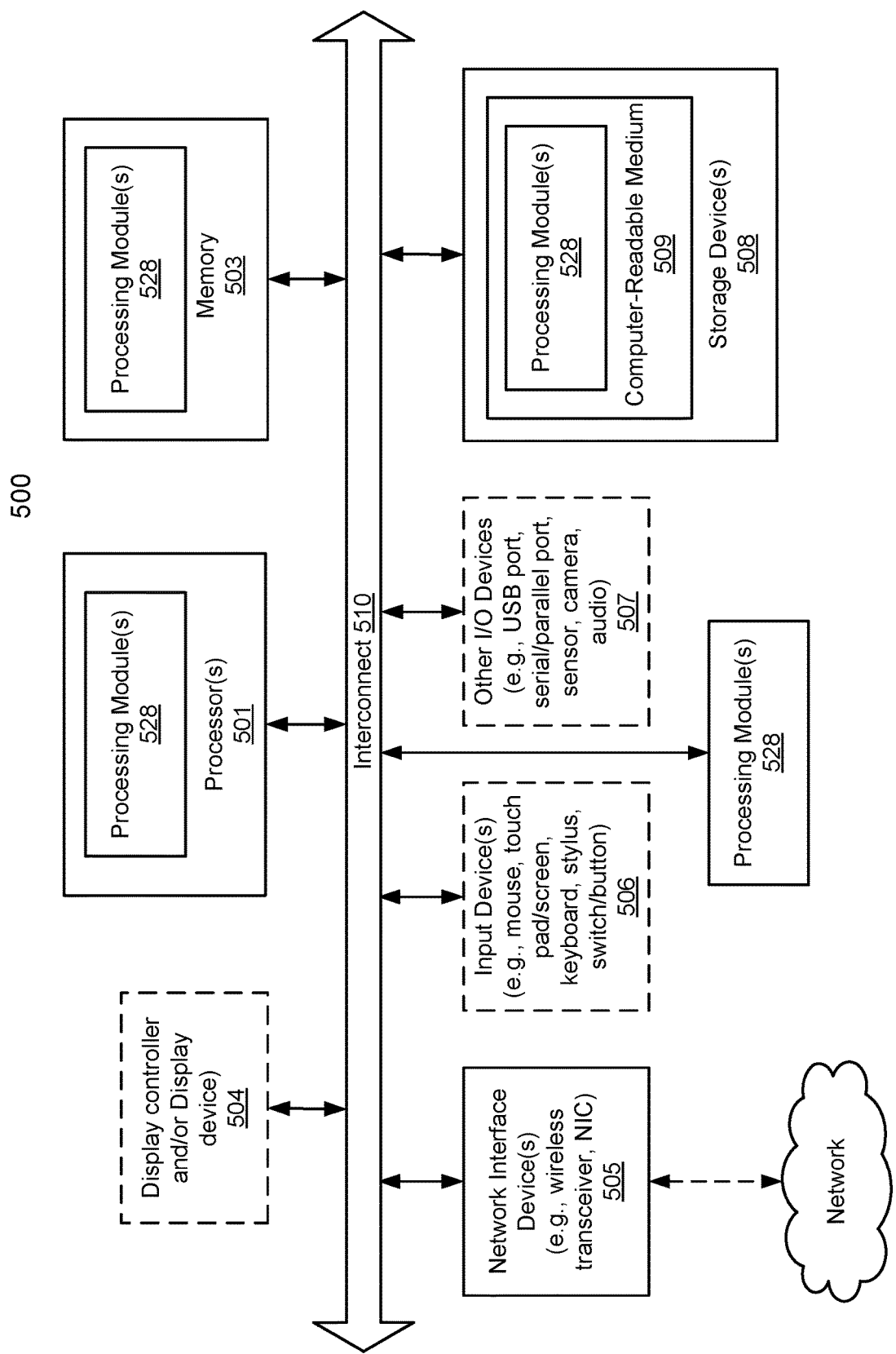
FIG. 5 shows a block diagram illustrating a data processing system in accordance with an embodiment.

Any of the components illustrated in FIGS. 1-2 may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for securing a data processing system, the method comprising and by the data processing system:
    identifying an occurrence of a security event for an operation of the data processing system;
    based on the occurrence:
        identifying a security requirement for the security event;
        performing at least two diverse cryptographic operations on data associated with the operation of the data processing system based on the security requirement and a cryptographic data package to obtain at least two cryptographic results for the data, the at least two cryptographic results being provided by respective diverse cryptographic operations of the two diverse cryptographic operations, wherein the security requirement specifies to the data processing system a cryptographical operation type of each of the at least two diverse cryptographic operations and whether the at least two diverse cryptographic operations are to be performed on the data in a serial or parallel manner; and
    performing an action set based on the at least two cryptographic results to complete a servicing of the operation of the data processing system.

2. The method of claim 1, wherein each of the at least two diverse cryptographic operations are performed as part of different types of cryptographic algorithms.

3. The method of claim 2, wherein each of the different types of cryptographic algorithms invokes functions stored in different and separately stored cryptographic libraries, each of the different and separate cryptographic libraries being a code library.

4. The method of claim 3, wherein each of the at least two diverse cryptographic operations use different portions of cryptographic data of the cryptographic data package.

5. The method of claim 4, wherein the operation of the data processing system is a decryption operation for a file that is sequentially dual encrypted using at least two diverse encryption algorithms that are complementary to the at least two diverse cryptographic operations which are decryptions operations, and the at least two diverse decryption operations are performed sequentially on the file that is sequentially dual encrypted, the file being the data.

6. The method of claim 4, wherein the operation of the data processing system is an encryption operation for a data structure, the at least two diverse cryptographic operations are encryption operations performed sequentially on the data structure, and the different portions of the cryptographic data of the cryptographic data package are used to sequentially dual encrypt the data structure, the data structure being the data.

7. The method of claim 4, wherein the operation of the data processing system is a communication operation, and the at least two diverse cryptographic operations are validation operations performed in an at least partially parallel manner on a double signed data structure, the double signed data structure being the data.

8. The method of claim 1, wherein the operation of the data processing system is for decryption of a file, the file being the data and comprises a number of copies of a payload multiply encrypted using a combination of encryption algorithms, and the cryptographic data package comprises cryptographic data for a combination of decryption algorithms complementary to one of the combinations of encryption algorithms, and the cryptographic data package omits cryptographic data for other combinations of the decryption algorithms that are complementary to other combinations of the encryption algorithms.

9. The method of claim 1, wherein the cryptographic data package comprises multiple portions of cryptographic data.

10. The method of claim 9, wherein the multiple portions of cryptographic data comprise at least two symmetric keys, and at least two asymmetric keys.

11. The method of claim 1, wherein the at least two diverse cryptographic operations comprises:
  a first diverse cryptographic operation that is performed using a first cryptographic algorithm that invokes a first set of functions stored in a first cryptographic library, and
  a second diverse cryptographic operation that is performed using a second cryptographic algorithm of a type different from the first cryptographic algorithm, the second cryptographic algorithm invokes a second set of functions stored in a second cryptographic library that is separately stored from the first cryptographic library, the second set of functions define second hashing rules for a second hash function that are different from first hashing rules for a first hash function defined by the first set of functions stored in the first cryptographic library, and each of the first cryptographic library and the second cryptographic library is a code library.

12. The method of claim 1, wherein the security requirement further indicates a threshold quantity of successfully performed cryptographic operations for a security risk associated with the operation of the data processing system to be considered tolerable for performance of the operation of the data processing system.

13. A non-transitory machine-readable medium having instructions stored therein, which when executed by a processor of a data processing system, cause the processor to perform operations for securing the data processing system, the operations comprising:
  identifying an occurrence of a security event for an operation of the data processing system;
  based on the occurrence:
    identifying a security requirement for the security event;
    performing at least two diverse cryptographic operations on data associated with the operation of the data processing system based on the security requirement and a cryptographic data package to obtain at least two cryptographic results for the data, the at least two cryptographic results being provided by respective diverse cryptographic operations of the two diverse cryptographic operations, wherein the security requirement specifies to the data processing system a cryptographical operation type of each of the at least two diverse cryptographic operations and whether the at least two diverse cryptographic operations are to be performed on the data in a serial or parallel manner; and
  performing an action set based on the at least two cryptographic results to complete a servicing of the operation of the data processing system.

14. The non-transitory machine-readable medium of claim 13, wherein each of the at least two diverse cryptographic operations are performed as part of different types of cryptographic algorithms.

15. The non-transitory machine-readable medium of claim 14, wherein each of the different types of cryptographic algorithms have different cryptographic library dependencies.

16. The non-transitory machine-readable medium of claim 15, wherein each of the at least two diverse cryptographic operations use different portions of cryptographic data of the cryptographic data package.

17. A data processing system, comprising:
  a processor; and
  a memory coupled to the processor to store instructions, which when executed by the processor, cause the processor to perform operations for securing the data processing system, the operations comprising:
    identifying an occurrence of a security event for an operation of the data processing system;
    based on the occurrence:
      identifying a security requirement for the security event;
      performing at least two diverse cryptographic operations on data associated with the operation of the data processing system based on the security requirement and a cryptographic data package to obtain at least two cryptographic results for the data, the at least two cryptographic results being provided by respective diverse cryptographic operations of the two diverse cryptographic operations, wherein the security requirement specifies to the data processing system a cryptographical operation type of each of the at least two diverse cryptographic operations and whether the at least two diverse cryptographic operations are to be performed on the data in a serial or parallel manner; and
    performing an action set based on the at least two cryptographic results to complete a servicing of the operation of the data processing system.

18. The data processing system of claim 17, wherein each of the at least two diverse cryptographic operations are performed as part of different types of cryptographic algorithms.

19. The data processing system of claim 18, wherein each of the different types of cryptographic algorithms have different cryptographic library dependencies.

20. The data processing system of claim 19, wherein each of the at least two diverse cryptographic operations use different portions of cryptographic data of the cryptographic data package.

* * * * *